(12) United States Patent
Rodeheffer (10) Patent No.: US 10,659,090 B2
(45) Date of Patent: May 19, 2020

(54) ANALOG CIRCUIT TIME CONSTANT COMPENSATION METHOD FOR A DIGITAL TRANSMITTER USING AN ANALOG OUTPUT

(71) Applicant: Rosemount Inc., Shakopee, MN (US)

(72) Inventor: John Edward Rodeheffer, Chaska, MN (US)

(73) Assignee: ROSEMOUNT INC., Shakopee, MN (US)

( * ) Notice: Subject to any disclaimer, the term of this patent is extended or adjusted under 35 U.S.C. 154(b) by 0 days.

(21) Appl. No.: 16/016,087

(22) Filed: Jun. 22, 2018

(65) Prior Publication Data
US 2019/0393909 A1 Dec. 26, 2019

(51) Int. Cl.
*H04B 1/04* (2006.01)

(52) U.S. Cl.
CPC ................... *H04B 1/0475* (2013.01)

(58) Field of Classification Search
CPC . H04B 1/0475; H04L 27/2626; H04L 27/367; H03H 17/0213; H03M 1/0629; H03M 1/46
See application file for complete search history.

(56) References Cited

U.S. PATENT DOCUMENTS

| 7,660,839 | B1* | 2/2010 | Melanson | ............... | H03H 17/04 |
| | | | | | 708/306 |
| 2004/0008793 | A1* | 1/2004 | Mujica | ................ | H04L 27/2626 |
| | | | | | 375/260 |
| 2006/0232264 | A1* | 10/2006 | Jurisch | ............... | G01R 19/2513 |
| | | | | | 324/142 |
| 2009/0002216 | A1* | 1/2009 | Joet | ..................... | H03M 1/0629 |
| | | | | | 341/172 |
| 2009/0195426 | A1* | 8/2009 | Ballantyne | .............. | H03M 3/50 |
| | | | | | 341/144 |
| 2009/0196374 | A1 | 8/2009 | Schulte et al. | | |
| 2013/0207827 | A1* | 8/2013 | Nestler | .................. | H03H 15/02 |
| | | | | | 341/172 |
| 2014/0254717 | A1 | 9/2014 | Schulte | | |
| 2016/0020779 | A1 | 1/2016 | Zhu et al. | | |

OTHER PUBLICATIONS

"The Design of Multiplierless FIR Filters for Compensating D/A Converter Frequency Response Distortion", by H. Samueli, IEEE Transactions on Circuits and Systems, vol. 35, No. 8, Aug. 1988.
Notification of Transmittal of the International Search Report and the Written Opinion of the International Searching Authority from International Application No. PCT/US2019/035518, dated Aug. 22, 2019.

* cited by examiner

*Primary Examiner* — Khanh C Tran
(74) *Attorney, Agent, or Firm* — Westman, Champlin & Koehler, P.A.

(57) ABSTRACT

A process transmitter includes a circuit producing a plurality of digital values representing magnitudes for an analog signal and a filter receiving the plurality of digital values and producing a plurality of filtered digital values. Output analog circuitry in the process transmitter is configured to receive the filtered digital values and output an analog signal on a communication channel of the process transmitter. The output analog circuitry has a transfer function and the filter has a transfer function. The transfer function of the filter at least partially offsets the transfer function of the output analog circuitry.

15 Claims, 10 Drawing Sheets

ANALOG CIRCUIT TIME CONSTANT COMPENSATION METHOD FOR A DIGITAL TRANSMITTER USING AN ANALOG OUTPUT

FIELD

The various embodiments relate to process transmitters. In particular, the various embodiments relate to signal compensation for process transmitters.

BACKGROUND

Process transmitters generally include process variable sensors and measurement circuitry for measuring process related parameters (temperature, pressure, flow rate, volume, etc.). Pressure transmitters also include output circuitry for transmitting a process parameter output to instrumentation and control equipment. Frequently, this transmission is over an analog circuit such as a 4-20 mA current loop, which requires analog output circuitry.

SUMMARY

A process transmitter includes a circuit producing a plurality of digital values representing magnitudes for an analog signal and a filter receiving the plurality of digital values and producing a plurality of filtered digital values. Output analog circuitry in the process transmitter is configured to receive the filtered digital values and output an analog signal on a communication channel of the process transmitter. The output analog circuitry has a transfer function and the filter has a transfer function. The transfer function of the filter at least partially offsets the transfer function of the output analog circuitry.

In accordance with a further embodiment, a process transmitter includes a sensor providing a sensor signal representative of a process variable and circuit elements providing a plurality of digital values based on the sensor signal. A filter filters the plurality of digital values to form filtered digital values and output analog circuitry receives the filtered digital values and produces an analog signal based on the filtered digital values. The output analog circuitry has a frequency-domain transfer function and the filtered digital values at least partially counteract effects of the frequency-domain transfer function.

In accordance with a still further embodiment, a method includes generating a digital value representing a desired magnitude for an analog output of a process transmitter and filtering the digital value to produce a filtered digital value. The filtered digital value is applied to output analog circuitry to produce the analog output for the process transmitter. The output analog circuitry has a transfer function with a pole and the filter has a transfer function with a zero that is the inverse of the pole.

DETAILED DESCRIPTION OF ILLUSTRATIVE EMBODIMENTS

Figure 1:
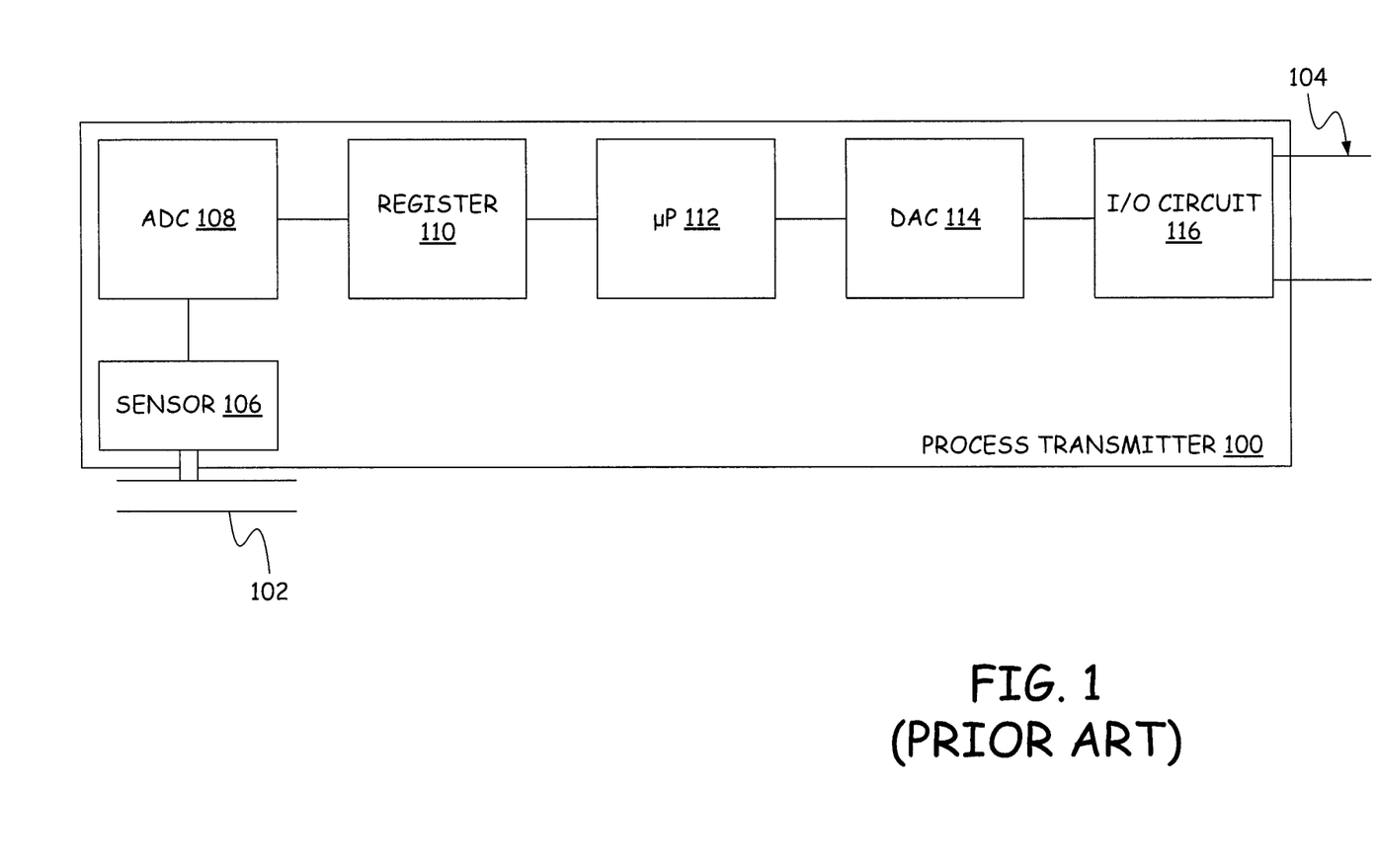
FIG. 1 is a block diagram of a process transmitter under the prior art.

FIG. 1 provides a block diagram of a process transmitter 100 in accordance with the prior art. Process transmitter 100 senses a process variable of a fluid or material carried in a conduit 102 and communicates information about the process variable along a communication channel 104. Process transmitter 100 includes a sensor 106 that senses the process variable and generates an analog value representative of the process variable. The analog value is provided to an analog-to-digital converter 108, which converts the analog signal into a series of digital values that are stored in a register 110. A microprocessor 112 accesses input register 110 to retrieve the stored values and either provides the stored values directly to a digital-to-analog converter 114 or compensates the digital values to account for errors in sensor 106 and/or to shift and scale the digital values so that they fit within a range of values that are allowed by communication channel 104. For example, when communication channel 104 is a two-wire current loop that utilizes the 4-20 mA standard, each digital value is scaled so as to produce a current that is between 4 and 20 mA. Digital-to-analog converter 114 converts the digital values it receives into an analog signal that is then applied to additional analog components in an I/O circuit 116 to control the signal on communication channel 104.

In some applications, the speed with which process transmitter 100 can obtain a new sensor value and transmit that value on communication loop 104 is critical to the monitoring of the process variable. For example, in compressor control applications, the response time of the pressure transmitter to pressure changes must be fast enough to capture transient changes in flow that occur during surges to capture when the operating point crosses the surge line, which can occur within a 20-50 millisecond time period. One component of a process transmitter's response time is the time constant of the analog circuit elements in digital-to-analog converter 114 and I/O circuit 116 that produce the analog signal on communication channel 104.

Figure 2:
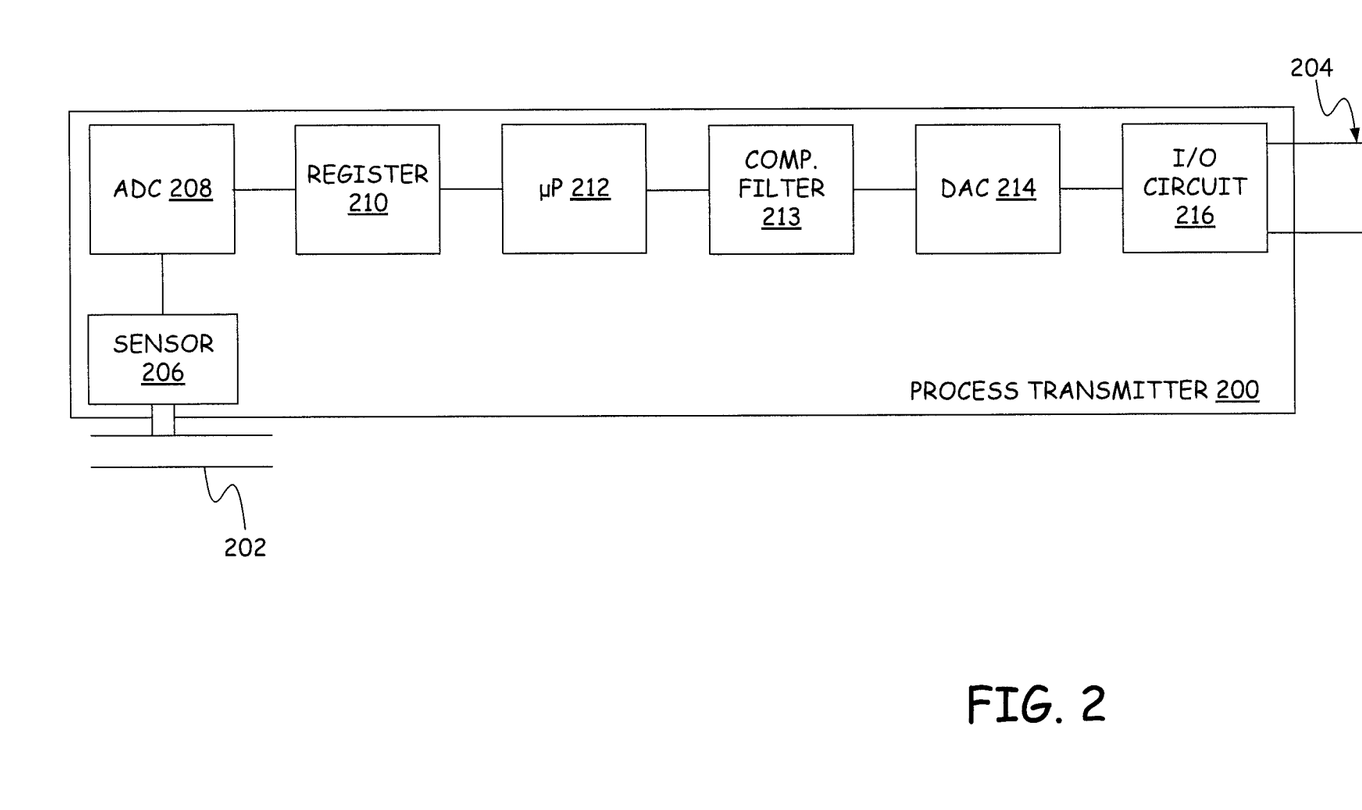
FIG. 2 is a block diagram of a process transmitter in accordance with one embodiment.

In accordance with one embodiment, the effect that the digital-to-analog converter and I/O circuit have on the process transmitter's response time is offset or partially neutralized by applying the digital values from the microprocessor to a compensating filter before providing the filtered digital values to the digital-to-analog converter. FIG. 2 provides a block diagram of one such embodiment.

In FIG. 2, a process transmitter 200 contains a sensor 206 that senses a process variable of a fluid or material carried in conduit 202. Sensor 206 provides an analog sensor signal to an analog-to-digital converter 208, which converts the analog sensor signal into a series of digital values by sampling the analog sensor signal at periodic intervals. The series of digital values are stored in a register 210, which is accessed by a microprocessor or circuit 212. Microprocessor or circuit 212 passes the stored digital values either directly to a compensating filter 213 or alters the stored digital values to compensate for errors in sensor 206 and/or to shift and scale the sensor values to place the sensor values in the range of output values supported by communication channel 204. In either case, the digital values provided to compensating filter 213 represent magnitudes of the analog signal that is to be placed on communication channel 204. Compensating filter 213 filters the series of digital values from microprocessor 212 to produce a series (also referred to as a plurality) of filtered digital values that are input to digital-to-analog converter 214. Digital-to-analog converter 214 uses the digital values to generate an analog signal that that further drives output analog elements in I/O circuit 216 to produce an analog communication signal on communication channel 204. In accordance with one embodiment, communication channel 204 is a 4-20 mA current loop, however, the embodiment is not limited to a single communication standard.

To offset the effect that digital-to-analog converter 214 and I/O circuit 216 have on the response time of the process transmitter, compensating filter 213 is designed to at least partially offset or neutralize the frequency-domain transfer function of the output analog circuitry of digital-to-analog converter 214 and I/O circuit 216.

Specifically, the output analog circuitry of digital-to-analog converter 214 and I/O circuit 216 has a frequency domain transfer function of:

$$H(s) = \frac{1}{1+s\tau_a} \qquad \text{EQ. 1}$$

The inverse of this function is $$H(s)^{-1} = 1+s\tau_a \qquad \text{EQ. 2}$$

Of course, the product of these two transfer functions is simply the identity value of 1:

$$H(s) \cdot H(s)^{-1} = \frac{1}{1+s\tau_a} \cdot 1+s\tau_a = 1 \qquad \text{EQ. 3}$$

Which indicates that using a compensating filter with a transfer function that is the inverse of the transfer function of the output analog circuitry will completely offset or neutralize the effects of the output analog circuitry's transfer function. To ensure the stability of the compensating filter, a pole is added to the inverse function. Specifically, in one embodiment, an all-pass filter is created by adding the pole 1+s T/2 where T is the update period of digital-to-analog converter 214 so that the transfer function of the compensating filter becomes $$F(s) = \frac{1+s\tau_a}{1+sT/2} \qquad \text{EQ. 4}$$

Note that this filter contains a zero, $1+s\tau_a$, that is the inverse of the pole, $$\frac{1}{1+s\tau_a},$$

found in the transfer function of the output analog circuitry. This filter is converted to the digital domain by using the well-known bilateral transform:

$$F(z) = \frac{1+s\tau_a}{1+sT/2}\bigg|_{s \to \frac{2}{T}\frac{1-z^{-1}}{1+z^{-1}}} = \frac{T-2\cdot\tau_a+z(T+2\cdot\tau_a)}{2\cdot T\cdot z} \qquad \text{EQ. 5}$$

Which is re-written as $$F_{ss}(z) = \frac{Y(z)}{X(z)} = \frac{T+2\cdot\tau_a}{2\cdot T} + \frac{T-2\cdot\tau_a}{2\cdot T}z^{-1} \qquad \text{EQ. 6}$$

From this result, it is easy to write the difference equation that describes the digital output, y(n), of compensating filter 213 in terms of a latest unfiltered digital input, x(n), and a previous unfiltered digital input, x(n−1):

$$y(n) = \frac{T+2\cdot\tau_a}{2\cdot T}x(n) + \frac{T-2\cdot\tau_a}{2\cdot T}x(n-1) \qquad \text{EQ. 7}$$

or $$y(n) = \frac{T+2\cdot\tau_a}{T}\Delta(n) + x(n-1) \qquad \text{EQ. 8}$$

Where $$\Delta(n) = x(n) - x(n-1)$$

For example, for a digital-to-analog converter with an update period T of 6 mS and an output analog circuitry time constant $\tau_a$ of 12 mS, equations 7 and 8 become:

$$y(n)=2.5x(n)-1.5x(n-1) \qquad \text{EQ. 9}$$

and $$y(n)=2.5\Delta(n)+x(n-1) \qquad \text{EQ. 10}$$

By using compensating filter 213 to at least partially neutralize or offset the frequency-domain transfer function of the output analog circuitry, the response time of the output analog circuitry can be reduced while maintaining the output analog circuitry and its critical time constant, which ensures signal stability as well as desired output behavior.

Figure 3:
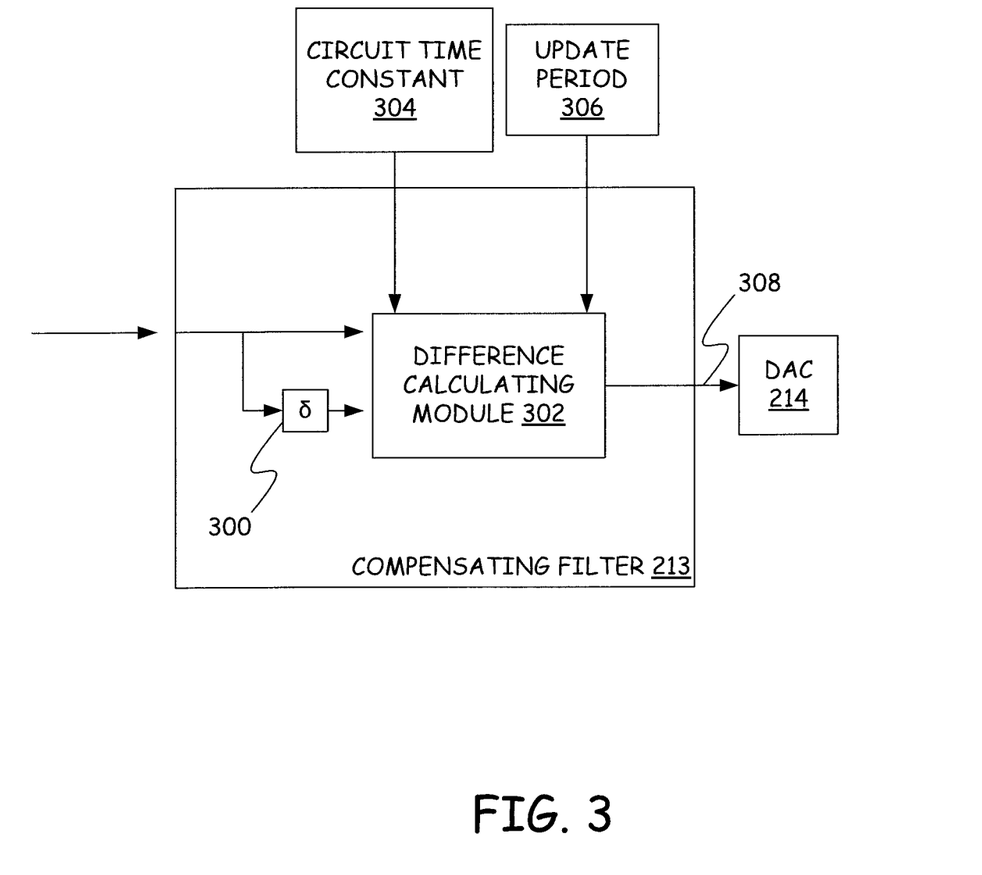
FIG. 3 is a block diagram of the compensating filter of FIG. 2.

FIG. 3 provides a block diagram of compensating filter 213 in accordance with one embodiment. In FIG. 3, compensating filter 213 includes a delay unit 300 and a difference calculating module 302. Compensating filter 213 receives a sequence of digital values with the current digital value being provided directly to difference calculation module 302 and a previous digital value being provided by delay unit 300. Difference calculation module 302 also receives circuit time constant 304 and update period 306 from a register or a memory location. Using Equation 7 or 8 above, difference calculation module 302 applies circuit time constant 304, update period 306, the current digital value and the previous digital value to compute a filtered digital value 308 for each input digital value. The filtered digital values are provided to digital-to-analog converter 214.

Figure 4:
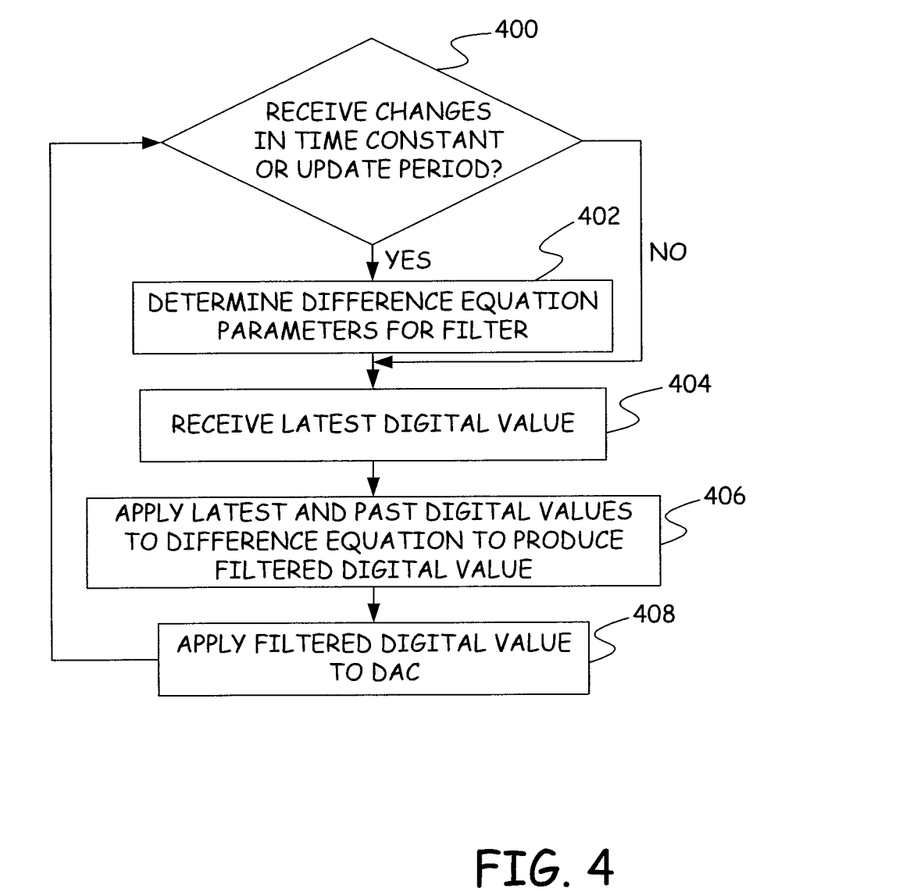
FIG. 4 is a flow diagram of a method in accordance with one embodiment.

FIG. 4 provides a flow diagram of a method of utilizing compensating filter 213 and digital-to-analog converter 214. At step 400, a determination is made as to whether changes have been received to the time constant or update period. If changes to either of these two values have been received, the parameters of the difference equation are re-determined for the filter at step 402 using Equation 7 above. If the time constant and update period have not changed at step 400, the process continues at step 404 where a current digital value (also referred to as a digital-to-analog converter reading) is received. The current digital value and a preceding digital value are then applied to the difference equation to produce a filtered digital value at step 406. The filtered digital value is then applied to the digital-to-analog converter at step 408. After the filtered digital value has been applied to the digital-to-analog converter, the process returns to step 400 to see if there have been any changes to the time constant or update period.

In alternative embodiments, changes to the difference equation parameters are triggered by an interrupt indicating that the time constant or update period has been changed. This interrupt can take the form of a call to a function to alter the difference equation parameters based on a new time constant and/or update period. Alternatively, the parameters for the difference equation can be calculated by a device other than the process transmitter 200 and can be sent to process transmitter 200 through communication channel 204.

Figure 5:
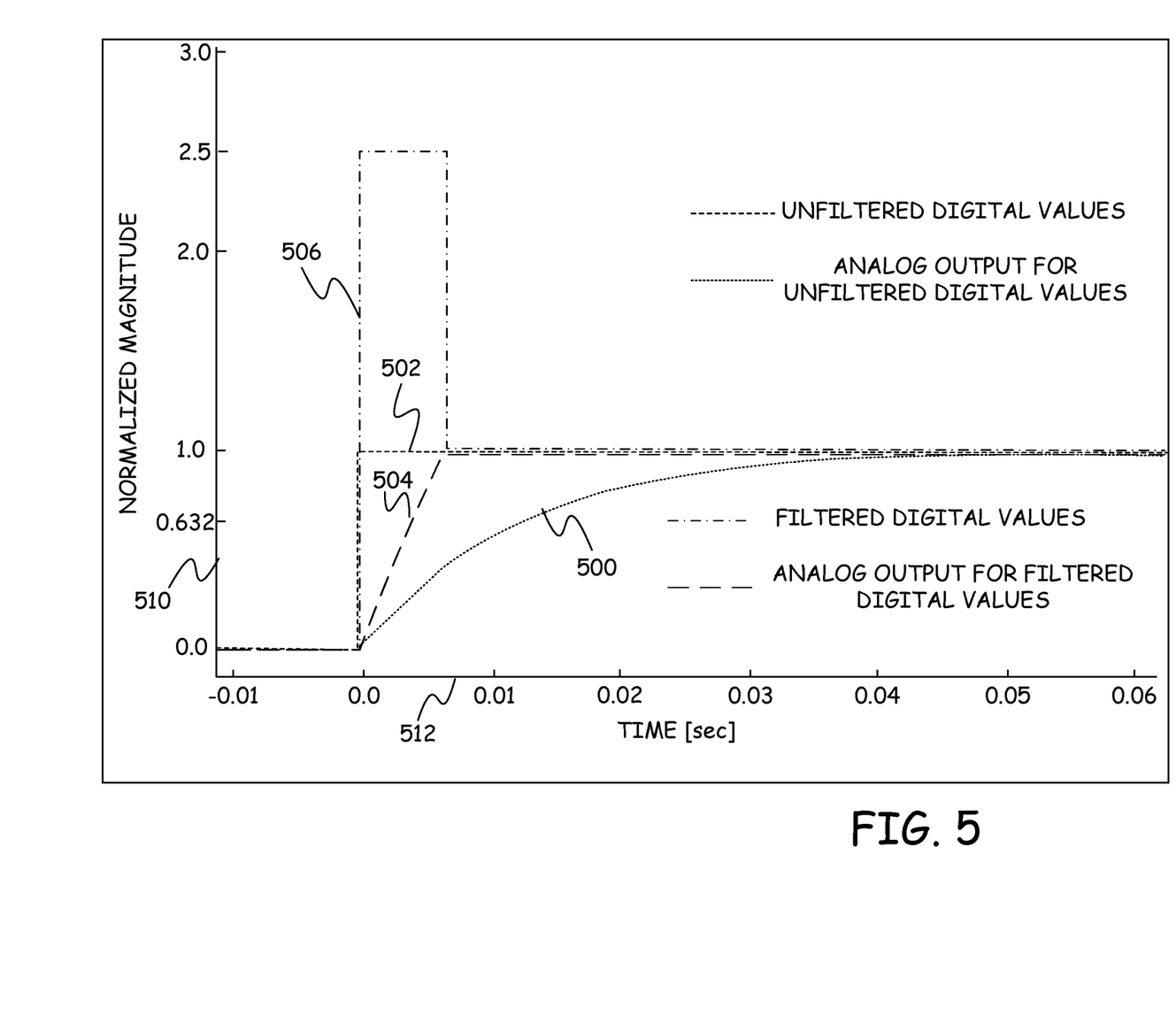
FIG. 5 is a graph of the digital-to-analog output response to a step input.

FIG. 5 provides a graph 500 of the analog output of digital-to-analog converter 214 and I/O circuit 216 in response to a series of unfiltered digital values 502 and a graph 504 of the analog output of digital-to-analog converter 214 and I/O circuit 216 in response to a series of filtered digital values 506. Filtered digital values 506 are produced by compensation filter 213 in response to the series of unfiltered digital values 502. In FIG. 5, vertical axis 510 shows the magnitudes of the digital and analog values normalized relative to the minimum and maximum allowed values on the communication channel. For example, for a 4-20 mA channel, the minimum value is 4 mA, which is designated as 0.0 on the vertical axis and the maximum value is 20 mA, which is designated as 1.0 on the vertical axis. Thus, each analog and digital value is shifted and scaled to position it on the graphs of FIG. 5 by subtracting 4 mA from the value and dividing the result by 16 mA. Time is shown along horizontal axis 512. In the example of FIG. 5, the update period T is 6 milliseconds.

In FIG. 5, the unfiltered digital values 502 show a step function where the unfiltered digital value at time 0 changes from 4 mA to 20 mA and then remains at 20 mA. In prior art process transmitter 100, this step input results in analog output 500, which has a response time (the time required to reach 63.2% of its final value) of 12 mS.

Compensating filter 213 receives unfiltered digital values 502 and produces filtered digital values 506 from the unfiltered values. In particular, for an update period of 6 mS and a time constant of 12 mS, compensating filter 213 produces a filtered digital value of 44 mA at time point 0 because the preceding unfiltered digital value was 4 mA and the current unfiltered digital value is 20 mA resulting in:

$y(n)=2.5*16$ mA+4 mA=44 mA (using Equation 10 above)

At 6 mS and every update period thereafter, compensating filter 213 produces a filtered digital value of 20 mA because the preceding unfiltered digital value is 20 mA and the current unfiltered digital value is 20 mA resulting in:

$y(n)=2.5*(20-20)$ mA+20 mA=20 mA (using Equation 10 above)

When filtered digital values 506 are applied to digital-to-analog converter 214, the resulting analog output 504 has a response time of 3.5 mS, which is much shorter than the 12 mS of the prior art. In addition, analog output 504 reaches its final value within a single update period.

In the embodiment of FIG. 2, digital-to-analog converter 214 must have a large dynamic range to accommodate the large range of digital values output by compensating filter 213. For example, using the example filter described above, digital-to-analog converter 214 must be able to accommodate a digital command of 44 mA associated with a full range positive step in the unfiltered digital values and must accommodate a digital command of −20 mA, which is the filtered digital value produced by the example filter in response to a full range negative step (from 20 mA to 4 mA) in the unfiltered digital values.

Figure 6:
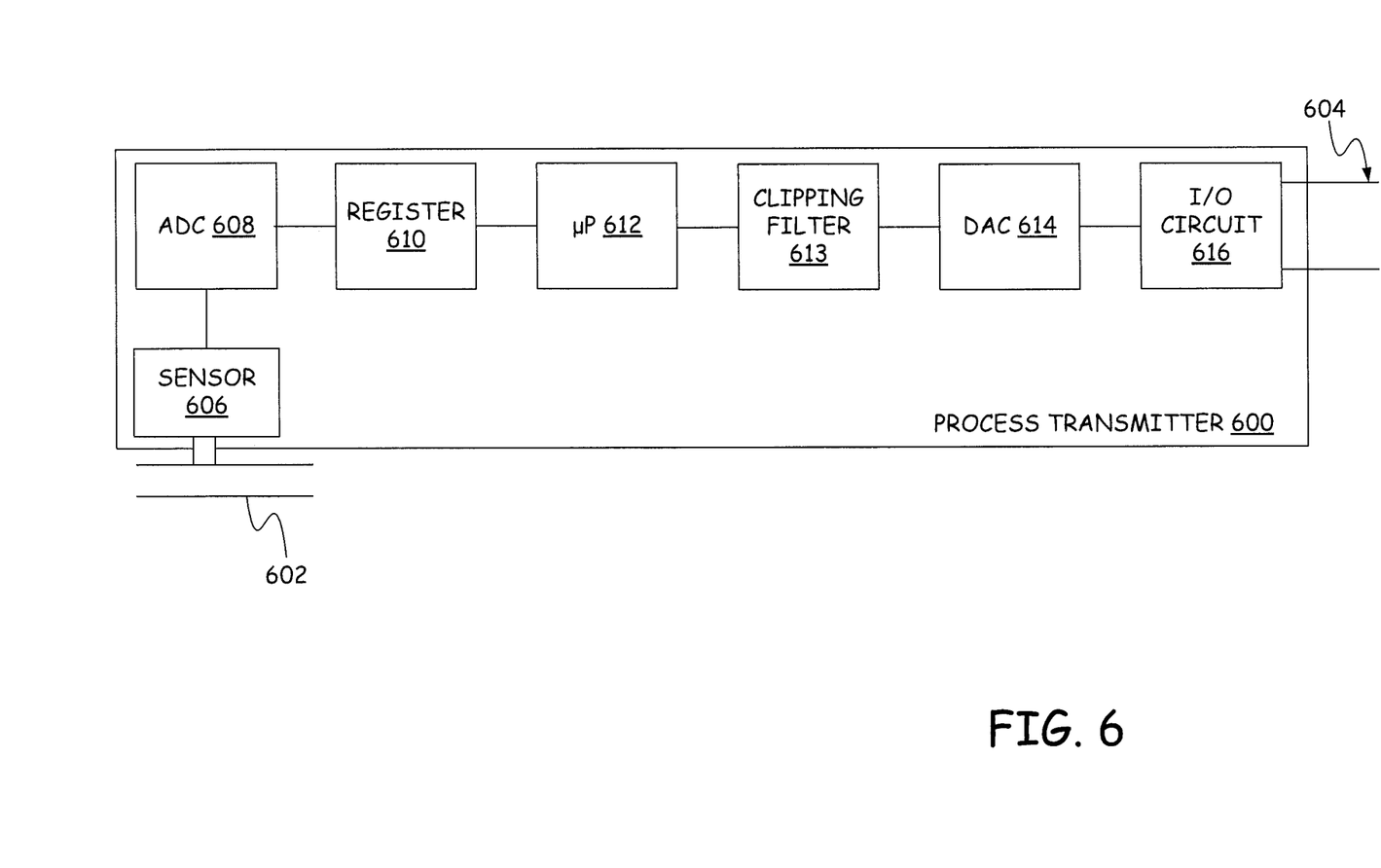
FIG. 6 is a block diagram of a process transmitter in accordance with a further embodiment.

As an alternative to utilizing a digital-to-analog converter 214 with such a large dynamic range, a further embodiment shown in FIG. 6 utilizes a clipping filter 613 in place of compensating filter 213, where clipping filter 613 limits the range of filtered digital values (digital commands) applied to the digital-to-analog converter. In FIG. 6, a process transmitter 600 senses a process variable of a fluid or material in a conduit 602 and generates an analog signal on a communication channel 604 representative of the sensed process variable. In particular, processor transmitter 600 includes a sensor 606, which generates an analog sensor signal indicative of the process variable. The analog sensor signal is provided to an analog-to-digital converter 608, which converts the analog signal into a series of digital values that are stored in a register 610. A microprocessor or circuit 612 accesses the stored values in register 610 and either provides them directly to clipping filter 613 or alters them to compensate the digital values for errors in sensor 606 and/or to scale and shift the values to a range of values supported by communication channel 604 such as values between 4 and 20 mA. In either case, the digital values provided to clipping filter 613 represent the magnitudes of the analog signal to be transmitted on communication channel 604. Clipping filter 613 includes a compensating filter emulator, which generates filtered digital values similar to the way in which compensating filter 213 generates filtered values so as to at least partially neutralize or offset the frequency-domain transfer function of digital-to-analog converter 614. In addition, clipping filter 613 examines the output filtered digital values and replaces any digital values outside of a clipping range with a maximum or minimum value of the range. The digital values output by clipping filter 613 are provided to digital-to-analog converter 614, which uses the values to generate an analog signal used to control I/O circuit 616 and thereby form an analog signal on communication channel 604.

Figure 7:
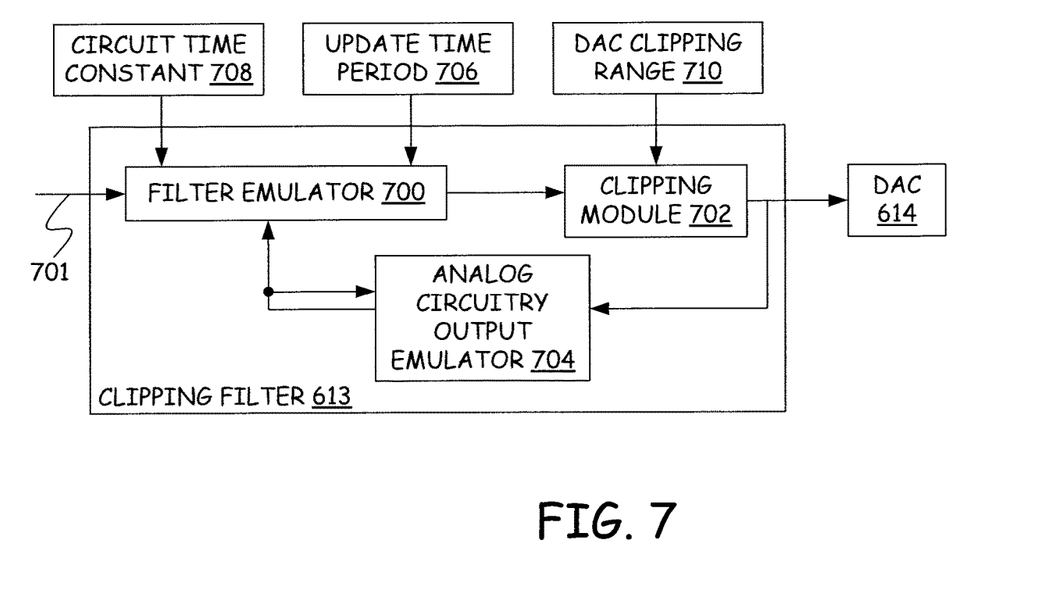
FIG. 7 is a block diagram of the clipping filter of FIG. 6.
Figure 8:
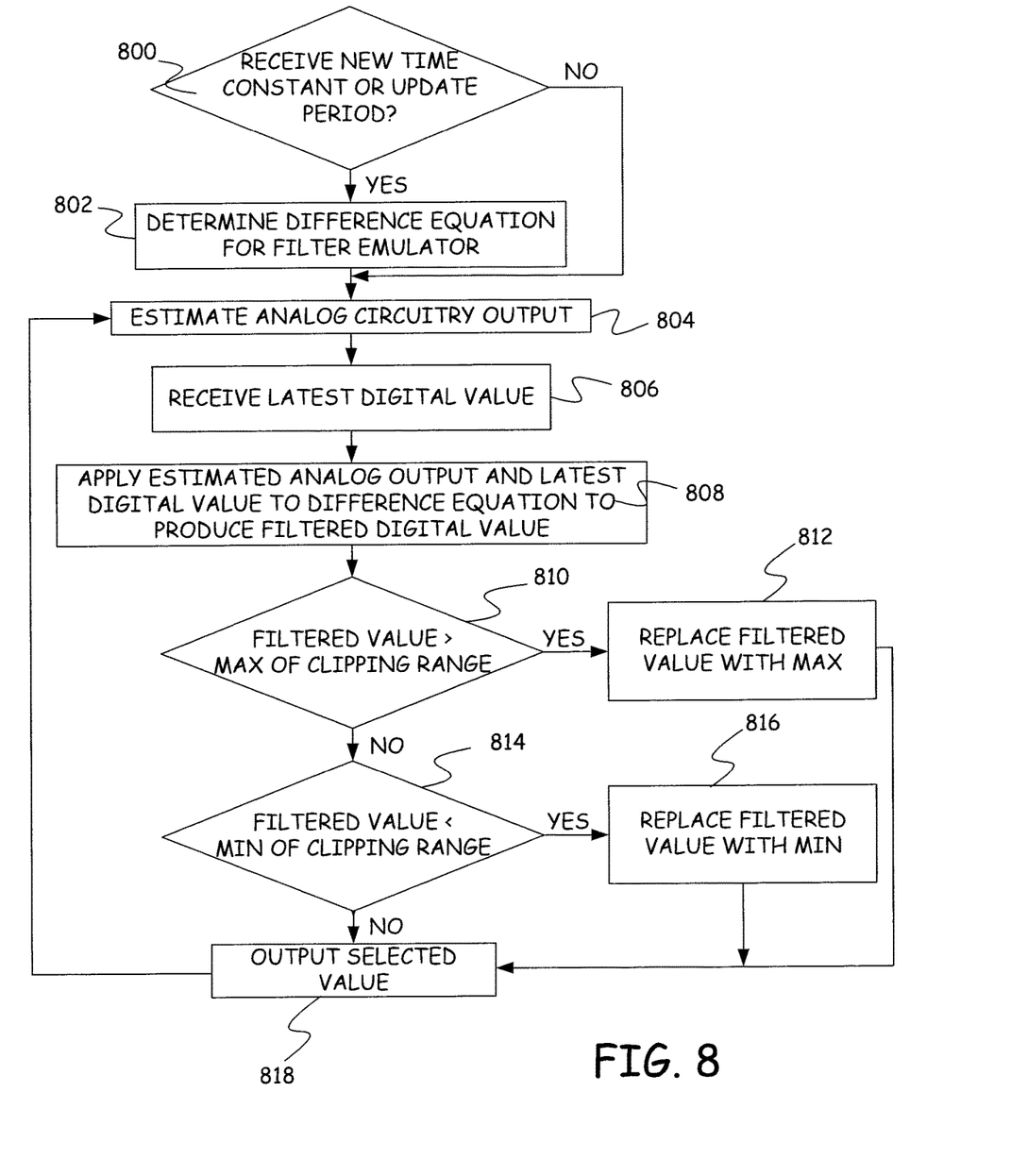
FIG. 8 is a flow diagram of a method in accordance with a further embodiment.

FIG. 7 provides a block diagram of one embodiment of clipping filter 613 and FIG. 8 provides a method of using clipping filter 613 in the embodiment of FIG. 7. Clipping filter 613 consists of a filter emulator 700, a clipping module 702 and an analog circuitry output emulator 704. In step 800 of FIG. 8, clipping filter 613 determines if a new value for the analog circuit time constant or a new value for the update period has been received. If the time constant or update period have changed, the difference equation (Equation 7) is re-determined for the new time constant and/or new update period at step 802. In accordance with other embodiments, instead of receiving a new time constant and/or new update period, clipping filter 613 can simply receive the new parameters for the difference equation through communication channel 604. After the difference equation has been re-determined at step 802 or if the difference equation does not need to be re-determined, the process of FIG. 8 continues at step 804 where the analog circuitry output emulator 704 estimates a latest output of the analog circuitry. In accordance with one embodiment, the latest output of the analog circuitry is estimated using:

$$a[n] = a[n-1] + (DAC[n-1] - a[n-1])(1 - e^{-T/\tau_a})  \quad \text{EQ. 11}$$

where a[n] is the estimated latest analog circuitry output in response to the previous digital value output by clipping filter 613, a[n−1] is the estimated analog circuitry output at the instance before the previous digital value output by clipping filter 613 was applied to digital-to-analog converter 614, T is the update period of the digital-to-analog convertor, $\tau_a$ is the time constant of the analog circuit, and DAC[n−1] is the previous output of clipping filter 613 provided to digital-to-analog converter 614.

At step 806, a latest unfiltered digital value is received from microprocessor 612 as input 701. At step 808, a filter emulator 700 uses the latest unfiltered digital value 701 and the estimated latest output of the analog circuitry from equation 11 to produce a filtered digital value. In particular, the filtered digital value is determined as:

$$y(n) = \frac{T + 2 \cdot \tau_a}{2 \cdot T} x(n) + \frac{T - 2 \cdot \tau_a}{2 \cdot T} a[n] \quad \text{EQ. 12}$$

where a[n] is the estimated latest output of the analog circuitry determined in step 804, T is the update time period 706, $T_a$ is the analog circuit time constant 708 and x(n) is the latest unfiltered digital value 701. Note that a[n] is used in equation 12 instead of x(n−1) because a[n] reflects any clipping applied by clipping filter 613.

The filtered digital value, y(n), output by filter emulator 700 is provided to clipping module 702, which performs a clipping function by determining if the filtered digital value exceeds a maximum of a digital-to-analog clipping range 710 at step 810. If the filtered digital value exceeds the maximum of the clipping range, clipping module 702 replaces the filtered digital value with the maximum of the clipping range at step 812 and provides the maximum of the clipping range as the output of clipping filter 613 for time n at step 818. If the filtered digital value is not greater than the maximum of the clipping range at step 810, clipping module 702 determines if the filtered digital value is less than the minimum of the clipping range at step 814. If the filtered digital value is less than the minimum of the clipping range at step 814, the filtered digital value is replaced with the minimum of the clipping range at step 816 and the minimum of the clipping range is provided as the output of clipping filter 613 for time n at step 818. If the filtered digital value is not less than the minimum of the clipping range, clipping module 702 provides the filtered digital value produced by filter emulator 700 as the output of clipping filter 613 for time n at step 818. In accordance with other embodiments, the filtered digital value is compared to the minimum of the clipping range before being compared to the maximum of the clipping range.

The selected output of clipping filter 613 is provided to digital-to-analog converter 614 and is fed back to analog circuitry output emulator 704, which uses the clipping filter output to form a new estimate of the output of the analog circuitry upon returning to step 804.

Figure 9:
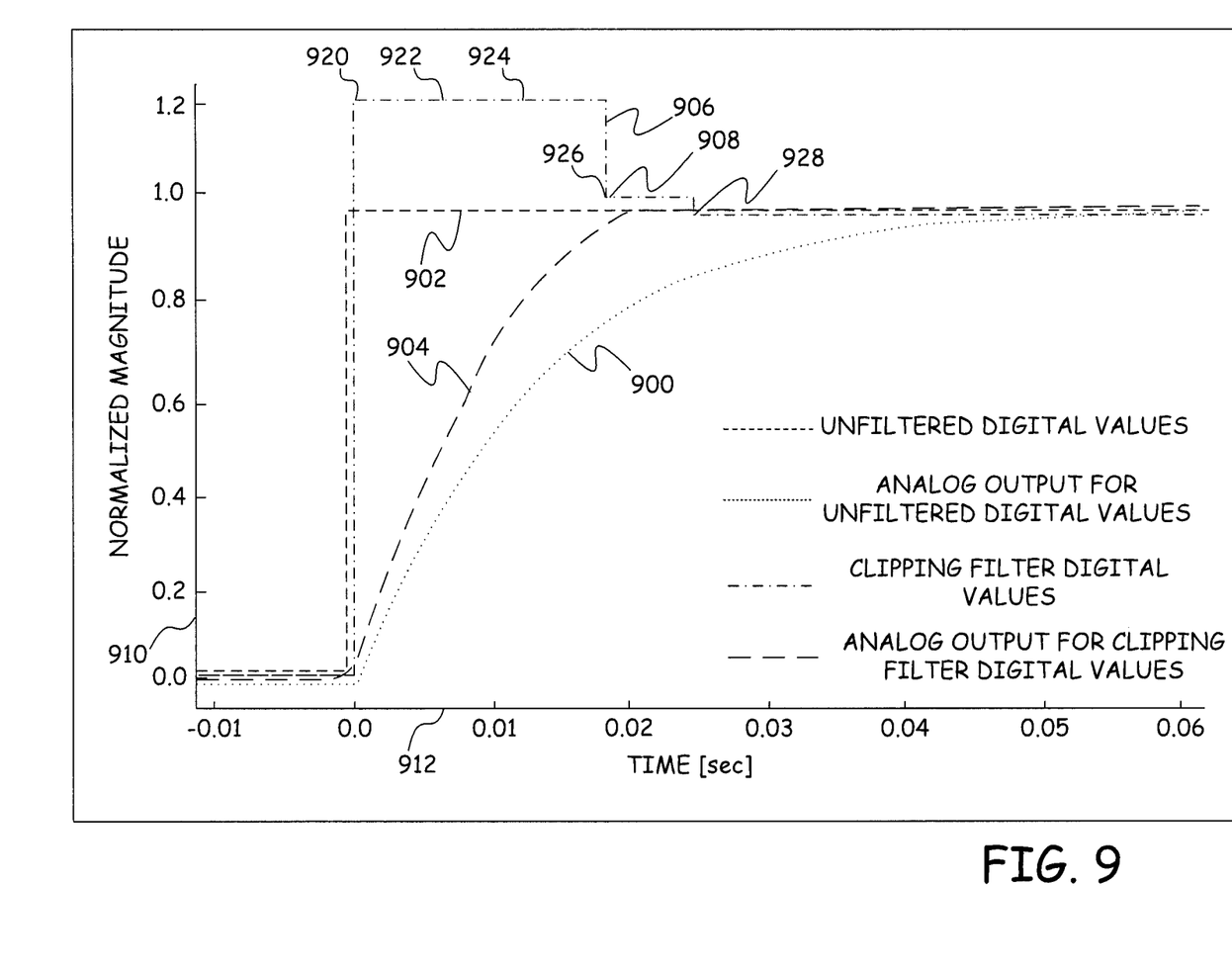
FIG. 9 is a graph of the digital-to-analog converter output as a function of input command.

FIG. 9 provides a graph 900 of the analog output of digital-to-analog converter 614 for unfiltered digital input 902 and a graph 904 of the analog output of digital-to-analog converter 614 for the filtered digital input 906 from clipping filter 613. In FIG. 9, filtered digital input 906 is produced by clipping filter 613 from unfiltered digital input 902. In FIG. 9, vertical axis 910 shows the magnitudes of the digital and analog values normalized relative to the minimum and maximum allowed values on communication channel 604. For example, for a 4-20 mA channel, the minimum value is 4 mA, which is designated as 0.0 on the vertical axis and the maximum value is 20 mA, which is designated as 1.0 on the vertical axis. Thus, each analog and digital value is shifted and scaled to position it on the graphs of FIG. 9 by subtracting 4 mA from the value and dividing the result by 16 mA. Time is shown along horizontal axis 912. In the example of FIG. 9, the update period T is 6 milliseconds.

In FIG. 9, the unfiltered digital values 902 show a step function where the unfiltered digital value at time 0 changes from 4 mA to 20 mA and then remains at 20 mA. In prior art process transmitter 100, this step input results in analog output 900, which has a response time (the time required to reach 63.2% of its final value) of 12 mS.

In accordance with the embodiments shown in FIG. 9, the clipping range of clipping filter 613 is set to 0-24 mA for an output range on communication channel 604 of 4-20 mA. A value of 24 mA is equivalent to a normalized magnitude of 1.2 in the graphs of FIG. 9. As shown in FIG. 9, the step input of unfiltered digital values 902 causes clipping filter 613 to initially output clipped values of 24 mA (1.2 in FIG. 9) for the first three update periods 920, 922 and 924. Thus, for the first three update periods, clipping filter 613 reduces the filtered digital values produced by filter emulator 700 to the maximum of clipping range 710. For the fourth update period 926, the filtered digital value generated by filter emulator 710 is greater than the unfiltered digital value but less than the maximum of the clipping range so the filtered digital value is output directly as the output of clipping filter 613. At fifth update period 928 and all update periods thereafter, the filtered digital value is the same as the unfiltered digital value.

As shown by analog output 904, the response time for the output analog circuitry was reduced to 8.4 milliseconds when using the clipping filter digital values and was 12 milliseconds when using the unfiltered digital values. Thus, the embodiment of FIGS. 6 and 7 is able to reduce the response time of the output analog circuitry without greatly increasing the dynamic range of digital-to-analog converter 614.

Although the response time of the output analog circuitry was reduced, the combination of clipping filter 613 and digital-to-analog converter 614 requires four update time periods in order for the analog output to reach its final value. Thus, although the dynamic range requirement is reduced in the embodiment of FIGS. 6 and 7 relative to the embodiment of FIGS. 2 and 3, the amount of time required to reach the final value of the analog output is increased in the embodiments of FIGS. 6 and 7 relative to the embodiments of FIGS. 2 and 3.

Figure 10:
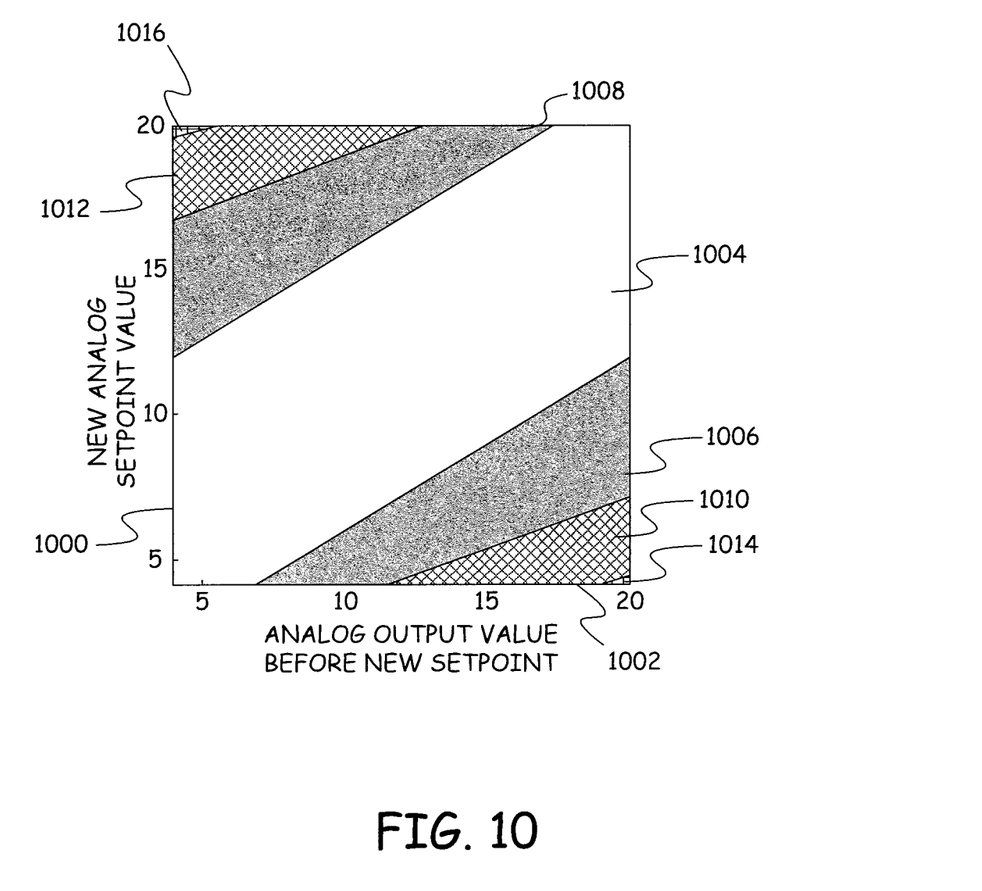
FIG. 10 is a graph of analog update cycles required for switching from a first analog output value to a second analog output value in accordance with one embodiment.

FIG. 10 provides a graph of the number of time update periods required to reach a final analog value from a beginning analog value using a clipping range of 0 to 24 mA for an analog output range of 4 to 20 mA. In FIG. 10, a desired analog output is shown on vertical axis 1000 and a current analog output is shown on horizontal axis 1002. Transitions from an analog output on the horizontal axis to an analog output on the vertical axis shown in the white area 1004 can be achieved in a single update period. Transitions from a current analog output to a desired analog output shown in grey areas 1006 and 1008 can be achieved in two update periods. Transitions from a current analog output to a desired analog output shown in areas 1010 and 1012 can be achieved in three updates and transitions from a current analog output to a desired analog output shown in areas 1014 and 1016 can be achieved in four update periods. As shown in FIG. 10, 58.3% of the possible conditions are met in a single update, 88.9% of the possible conditions are met in two updates and 99.8% of the possible conditions are met in just three updates.

In one exemplary embodiment, a pressure transmitter is used in a compressor application to detect surge events. In this embodiment, the control point that will trigger the identification of a surge event is set to an analog output of 17.33 mA from the pressure transmitter. This provides 16.7% of the full range of the pressure transmitter output to use for control purposes (20 mA-17.33 mA/20 mA-4 mA) while allowing ~43.3% of full range events (events that start at 20 mA output and cross to or below 17.33 mA output) to be detected in a single update period and ~69.3% of full range events to be detected in two update periods.

In further embodiments, the time constant used by the compensating filter or the clipping filter are adjusted based on the state of the process transmitter or of the environment surrounding the process transmitter such as the temperature of the process transmitter. In particular, environment sensors, such as temperature sensors, within the process transmitter generate sensor values that are then applied to equations that describe a relationship between the sensor values and the digital-to-analog converter's time constant. The result of these calculations is a new time constant for the converter that can then be used to recalculate the difference equation used within the compensating filter and clipping filter. In addition, less than full compensation could be applied to achieve marginal time response improvement and limit noise when desired.

Although the present invention has been described with reference to preferred embodiments, workers skilled in the art will recognize that changes may be made in form and detail without departing from the spirit and scope of the invention. In addition, although multiple embodiments are discussed above, elements of any one of the embodiments may be used with the other embodiments.

What is claimed is:

1. A process transmitter comprising:
 a circuit producing a plurality of digital values representing magnitudes for an analog signal;
 a filter receiving the plurality of digital values and producing a plurality of filtered digital values;
 output analog circuitry configured to receive the plurality of filtered digital values and output an analog signal on a communication channel of the process transmitter, wherein the output analog circuitry has a transfer function and wherein the filter has a transfer function that at least partially offsets the transfer function of the output analog circuitry; and
 wherein the filter comprises a clipping function to limit magnitudes of the filtered digital values to a range of magnitude values supported by the output analog circuitry and an analog circuitry output emulator that estimates a latest output of the output analog circuitry based on a previous output of the clipping function.

2. The process transmitter of claim 1 wherein the transfer function of the filter has a pole that is a function of an update time period of the output analog circuitry.

3. The process transmitter of claim 2 wherein the filter comprises an all-pass digital filter.

4. The process transmitter of claim 1 wherein the filter further comprises a filter emulator that uses the estimate of the latest output of the output analog circuitry to emulate an all-pass digital filter.

5. The process transmitter of claim 4 wherein the filter emulator uses a difference between a latest digital value and the estimate of the latest output of the output analog circuitry to determine a filtered digital value.

6. The process transmitter of claim 5 wherein the filter emulator uses a circuit time constant and an update time period for the output analog circuitry to determine the filtered digital value.

7. A process transmitter comprising:
 a sensor providing a sensor signal representative of a process variable;
 circuit elements providing a plurality of digital values based on the sensor signal;
 a filter filtering the plurality of digital values to form filtered digital values;
 output analog circuitry receiving the filtered digital values and producing an analog signal based on the filtered digital values wherein the output analog circuitry has a frequency-domain transfer function and wherein the filtered digital values at least partially counteract effects of the frequency-domain transfer function; and
 wherein the filter comprises a clipping function to limit magnitudes of the filtered digital values to a range of magnitude values supported by the output analog circuitry and an analog circuitry output estimator to estimate a latest output of the output analog circuitry from a previous output of the clipping function.

8. The process transmitter of claim 7 wherein the filter comprises an all-pass digital filter.

9. The process transmitter of claim 7 wherein the filter further comprises a filter emulator that uses the estimate of the latest output of the output analog circuitry to emulate an all-pass digital filter.

10. The process transmitter of claim 9 wherein the filter emulator uses a difference between a latest digital value from the circuit elements and the estimate of the latest output of the output analog circuitry to determine a filtered digital value.

11. The process transmitter of claim 10 wherein the filter emulator uses a circuit time constant and an update time period for the output analog circuitry to determine a filtered digital value.

12. A method comprising
 generating a digital value representing a desired magnitude for an analog output of a process transmitter;
 filtering the digital value to produce a filtered digital value;
 applying the filtered digital value to output analog circuitry to produce the analog output for the process transmitter wherein the output analog circuitry has a transfer function with a pole and the filter has a transfer function with a zero that is the inverse of the pole; and
 wherein filtering the digital value comprises using a circuit time constant and update time period of the output analog circuitry to determine the filtered digital value and applying a clipping function to limit the magnitude of the filtered digital value to a range of magnitude values supported by the output analog circuitry.

13. The method of claim 12 wherein the desired magnitude for the analog output is within a second range of values designated for a communication channel.

14. The method of claim 12 wherein filtering the digital value comprises estimating the analog output and using the estimate of the analog output to form the filtered digital value.

15. The method of claim 14 further comprising determining the circuit time constant based on a temperature of the process transmitter.

\* \* \* \* \*